United States Patent
Finney

[15] 3,640,578
[45] Feb. 8, 1972

[54] LEVELLING SYSTEM FOR SEMI END DUMP TRUCKS

[72] Inventor: James Harold Finney, 150 Page Way, Fortuna, Calif. 95540

[22] Filed: Feb. 6, 1970

[21] Appl. No.: 9,356

[52] U.S. Cl. ..........................................298/17 S, 298/22 AE
[51] Int. Cl. ..............................................................B60p 1/16
[58] Field of Search ..................298/22 R, 22 AE, 22 P, 17 S, 298/22 C, 17 R

[56] References Cited

UNITED STATES PATENTS

| | | | |
|---|---|---|---|
| 2,556,610 | 6/1951 | Biszantz | 298/17 S |
| 2,997,342 | 8/1961 | Talbert | 298/1 X |
| 2,999,721 | 9/1961 | Wood | 298/17 S |
| 3,039,822 | 6/1962 | McManus | 298/17 S |
| 3,041,111 | 6/1962 | Wyrick | 298/22 AE X |
| 3,512,836 | 5/1970 | Polich | 298/17 S |

FOREIGN PATENTS OR APPLICATIONS

| | | | |
|---|---|---|---|
| 422,533 | 1/1935 | Great Britain | 298/11 |

*Primary Examiner*—Richard J. Johnson
*Attorney*—Naylor & Neal

[57] ABSTRACT

In a dump truck wherein the entire trailer chassis is lifted upon dumping automatically adjustable stabilizing means is provided to maintain the dump body in a substantially level plane even though the truck may be disposed on an inclined surface. To accomplish this an adjustable stop means is provided between the truck dump body and a wheeled carriage which supports the rear end of the dump body and is capable of angular movement in the vertical plane with respect thereto. The adjustable stop means is operatively associated with a control mechanism which automatically adjusts the stop means in accordance with the degree of inclination of the terrain surface upon which the truck is supported.

4 Claims, 5 Drawing Figures

PATENTED FEB 8 1972

INVENTOR.
JAMES HAROLD FINNEY
BY Naylor & Neal
ATTORNEYS

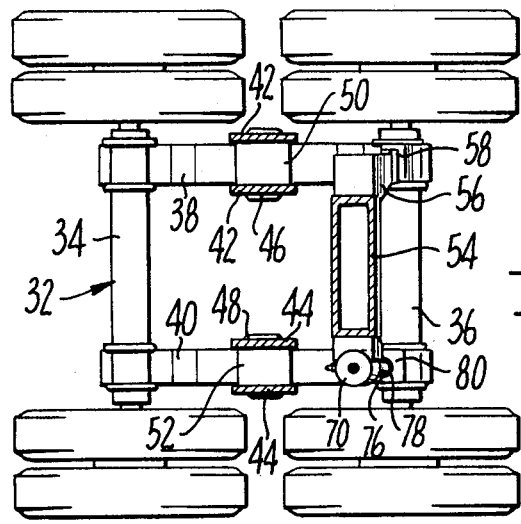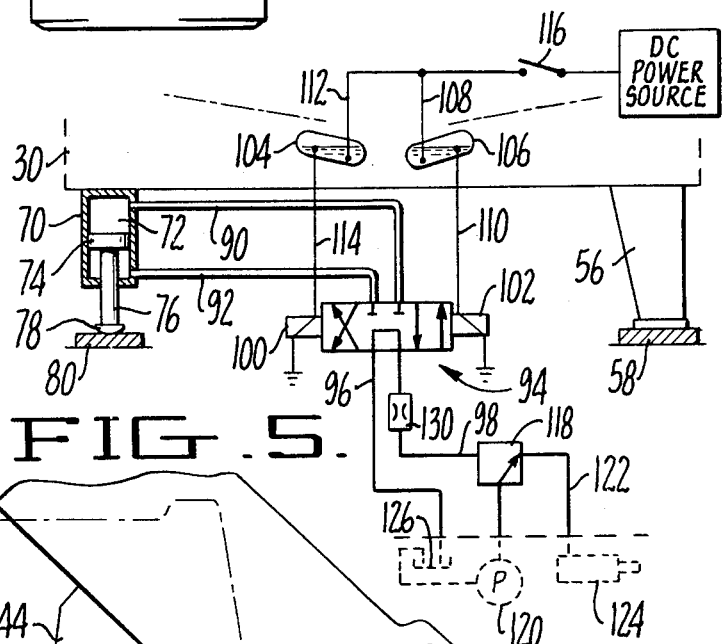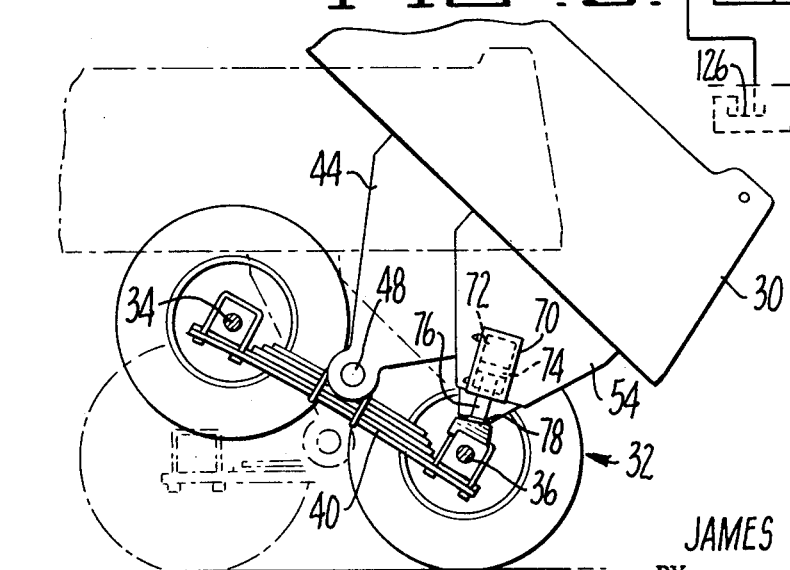

LEVELLING SYSTEM FOR SEMI END DUMP TRUCKS

BACKGROUND OF THE INVENTION

The present invention relates to semi end dump trucks, and more particularly, to a system for providing stability to equipment of this type when it is used in uneven or inclined terrain.

In the trucking industry increasing use has been made for earth hauling and the like of a semi end dump trailer wherein the entire trailer chassis is lifted upon dumping. In general, equipment of this type has a greater capacity and more use flexibility than do the more conventional dump trucks having fixed support frames relative to which dumping beds pivot. Due to the relatively long lengths of these semi end dump trailers some difficulty has been encountered when using them in uneven terrain or inclined surfaces. This is due to the fact that the center of gravity of the vehicle is substantially raised during elevation of the trailer during dumping. The resultant vehicle instability if too great will cause it to overturn. This of course may cause injury to the vehicle and driver and at the minimum will necessitate the expenditure of substantial time and money to return the vehicle to an upright condition.

SUMMARY OF THE INVENTION

It is therefore an object of the present invention to provide a system for stabilizing vehicles incorporating semi end dump trailers when said trailers are in a raised or dumping position.

It is a further object of the present invention to provide an arrangement whereby the dump body of a semi end dump trailer is continuously maintained in a substantially level plane during dumping even though the vehicle with which the trailer is associated is positioned on an inclined surface or being driven across uneven terrain.

DESCRIPTION OF THE DRAWINGS

The above-noted and other objects of the present invention will be understood from the following description taken with reference to the accompanying drawings wherein:

FIG. 3 is a cross-sectional plan view illustrating details of the semi end trailer wheeled carriage and the adjustable stop means according to the present invention.

FIG. 4 is a side elevational view illustrating details of the wheeled carriage and associated adjustable stop means.

FIG. 5 is a diagrammatic plan view of the adjustable stop means and the related control mechanism which is effective to adjust said stop means in accordance with terrain conditions encountered.

DESCRIPTION OF THE ILLUSTRATED EMBODIMENT

Figure 1:
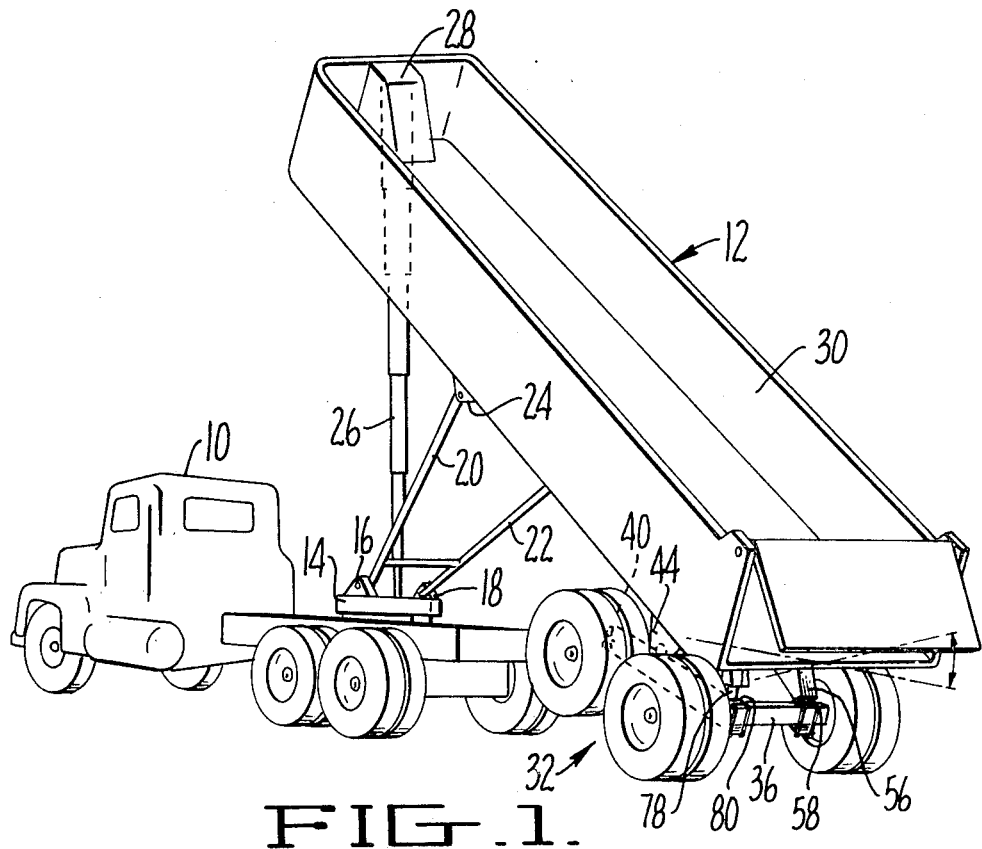
FIG. 1 is a perspective view illustrating a truck and semi end dump trailer modified in accordance with the teachings of the present invention and showing the dump trailer in an elevated or dumping position.

Referring now to FIG. 1, a vehicle incorporating a levelling system in accordance with the teachings of the present invention is illustrated. The vehicle includes a truck tractor 10 and a semi end dump trailer, indicated generally by means of reference numeral 12, which is connected to the tractor. Tractor 10 includes a fifth wheel 14 of more or less conventional design to which a pair of mounting brackets 16 and 18 are affixed. A pair of traction arms 20 and 22 are pivotally mounted on mounting brackets 16 and 18 respectively. Traction arms 20 and 22 extend to the trailer chassis and are pivotally connected thereto as at 24.

A hydraulically powered piston and cylinder assembly 26 extends between fifth wheel 14 and a housing 28 provided on the dump trailer 12. It is to be understood that when pressure fluid is introduced into assembly 26 it will assume the extended position illustrated. The extended assembly serves to raise the front end of the trailer so that material in the dump body 30 thereof will exit from the rear under the influence of gravity. When pressure fluid is removed from piston and cylinder assembly 26 it will telescope into housing 28 thus permitting the front of the dump trailer 12 to lower into engagement with tractor 10. The operation of piston and cylinder assembly 26 has not been described in greater detail since mechanisms of this type are well known in the trucking art today and since the assembly forms no part of the present invention.

Dump trailer 12 includes a carriage assembly which supports the rear end of dump body 30. The construction of this carriage assembly, which is indicated generally by means of reference numeral 32, may most readily be seen with reference to FIGS. 2, 3 and 4. Carriage assembly 32 includes tandem axles 34 and 36 carrying two pairs of wheels, respectively. Tandem axles 34 and 36 are mounted by means of U-bolts or the like to the ends of leaf springs 38 and 40 as may most clearly be seen in FIG. 3. Extending downwardly from the rear of the chassis of trailer 12 are two pairs of carriage support plates 42, 42 and 44, 44, respectively, which accommodate at the lower ends thereof support pivot pins 46 and 48 extending between each pair of plates. Freely pivotally mounted on support pivot pins 46 and 48 are pivot members 50 and 52, respectively. Leaf springs 38 and 40 are secured near the respective centers thereof to pivot members 50 and 52 by means of any desired expedient. It may thus be seen that leaf springs 38 and 40, and hence tandem axles 34 and 36 are freely pivotable with respect to trailer dump body 30 in the absence of some external restraining influence.

Generally positioned over tandem axle 36 is a structural support member 54 which is affixed to the chassis of dump trailer 12 and as may most clearly be seen with reference to FIG. 3, extends across the width of the trailer dump body 30 a distance somewhat less than the space between leaf springs 38 and 40. Fixedly secured to structural support member 54 on one end thereof is a bearing block 56 which extends in a downwardly direction from the support member 54 in a manner which is most clearly seen in FIG. 2. When the semi end dump trailer is in the elevated position shown in FIG. 1, bearing block 56 contacts a bearing member 58 (FIG. 2) which is disposed at one end of axle 36. When the semi end dump trailer 12 is in the lowered or substantially horizontal position which is not illustrated, the bottom of bearing block 56 is disposed up and away from bearing member 58. When, however, piston and cylinder assembly 26 is furnished with pressured liquid bearing block 56 is gradually lowered into engagement with bearing member 58 as the semi end dump trailer is raised. As engagement between the bearing block 56 and bearing member 58 takes place, rear axle 36 is forced forwardly and the side of carriage assembly 32 which is adjacent to bearing block 56 is raised off the ground at the front end thereof by the interconnection between carriage support plates 42 and leaf spring 38. It is to be understood that if an additional bearing block similar to bearing block 56 were disposed adjacent to the other end of tandem axle 36, the bottom of dump body 30 would remain parallel to the longitudinal axis of said axle. In the event rear axle 36 were inclined at an angle with respect to the horizontal, for example, the bottom of dump body 30 would also define the same angle with respect to the horizontal. This would create a potential truck tipping situation since the center of gravity of the vehicle is substantially raised when the semi end dump trailer 12 is in an elevated position.

In accordance with the teachings of the present invention the bottom of the trailer dump body 30 is maintained in a substantially horizontal plane even though the wheels of carriage assembly 32 are positioned on an inclined surface and the longitudinal axis of axle 36 is disposed at an angle with respect to the horizontal. The manner in which this is accomplished will now be described. Fixedly attached to structural support member 54 on the side thereof opposite from bearing block 56 is a housing 70 which defines an inner cylindrical chamber 72 in which a piston 74 is disposed for reciprocal movement. Fixedly attached to piston 74 and extending downwardly out of housing 70 is a shaft 76 having a stop plate 78 secured to the bottom thereof. Elements 70, 72, 74, 76 and 78 comprise the adjustable stop mechanism of the present invention.

Figure 2:
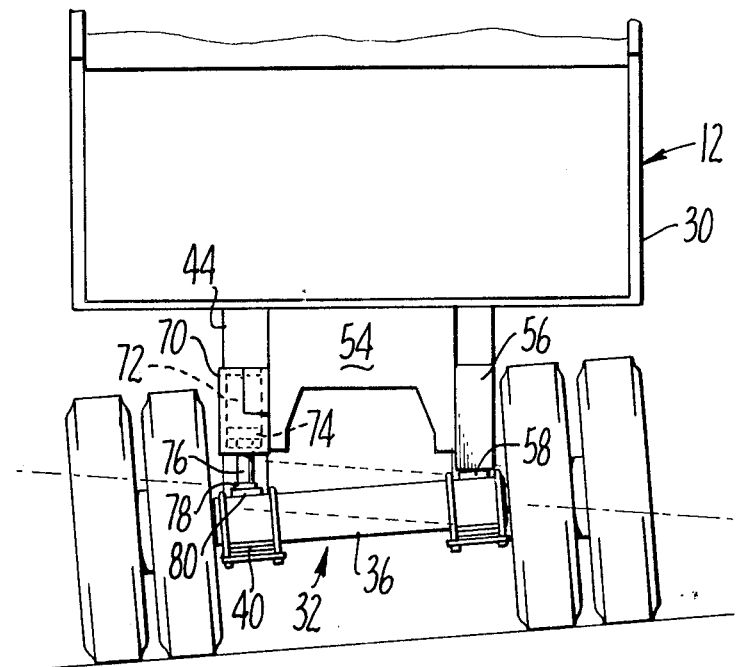
FIG. 2 is a rear elevational view of a semi end dump trailer embodying the invention with the rear axle thereof tilted as when positioned on an inclined surface or moving across uneven terrain.

It is of course to be understood that upward movement of piston 74 within chamber 72 rises stop plate 78. At the uppermost extent of its movement, stop plate 78 abuts against the bottom of housing 70 and the bottom of the stop plate is positioned some distance above the bottom of bearing block 56. With the piston 74 at or near the bottom of chamber 72 as illustrated in FIG. 2, for example, shaft 76 is in its extended position and the bottom of stop plate 78 is positioned some distance below the bottom of bearing block 56. A second bearing member 80 similar to bearing member 58 is disposed at the other end of axle 36 in such a manner that it is adapted to be contacted by stop plate 78 upon elevation of the semi end dump trailer 12 to a dumping position. By varying the position of stop plate 78 relative to the bottom of bearing block 56, any inclination of rear axle 36 may be compensated for. In FIG. 2 wheel carriage 32 is shown as being disposed on an inclined surface which slants downwardly toward the left as viewed in that Figure. By moving stop plate 78 downwardly below the bottom of bearing block 56 a distance equal to the difference in elevations of bearing blocks 58 and 80, the bottom of trailer dump body 30 will be made to assume a generally horizontal condition as shown. The leaf springs which serve to connect tandem axle 36 to the remainder of the dump trailer permit this relative movement between the axle and the dump body. By maintaining the bottom of dump body 30 in a substantially horizontal plane the center of gravity thereof will be maintained along a line substantially on center, thereby greatly reducing the possibility of overturning.

In the event the slope of the land were downwardly and toward the right as viewed in FIG. 2, rear axle 36 would assume the position illustrated by the dotted lines. In this instance, the bottom of the dump body 30 would be maintained in a substantially horizontal plane by the positioning of stop plate 78 so that the bottom thereof is disposed a correct distance above the bottom of bearing block 56.

Referring now to FIG. 5 the control mechanism for positioning stop plate 78 is illustrated in schematic form. As may readily be seen in that Figure, two fluid conduits 90 and 92 communicate with the inner cylindrical chamber 72 defined by housing 70. The conduit 90 communicates with cylindrical chamber 72 above piston 74 while fluid conduit 92 communicates with said chamber below the piston. At their respective other ends, fluid conduits 90 and 92 communicate with a valve 94 which is capable of assuming three positions. Communicating with valve 94 on the other side thereof are two additional fluid conduits 96 and 98. When the valve 94 is in the position illustrated, no communication is had between fluid conduits 90, 92, and 96, 98. In the event the valve is moved to the left as shown in FIG. 5, communication will be had between fluid conduits 92 and 96 and between fluid conduits 90 and 98. When the valve is moved to the right, fluid conduit 92 will communicate with fluid conduit 98 and fluid conduit 90 will communicate with fluid conduit 96. Movement of valve 94 is effected by means of solenoids 100 and 102 which are disposed at opposite ends thereof. When both of these solenoids are energized they exert opposite and equal pulling forces on valve 94 thus maintaining it in the centered position which is illustrated. In the event one of the solenoids is deenergized the valve 94 will be pulled in a direction away therefrom by the other of said solenoids. For example, in the event solenoid 100 were energized and solenoid 102 were not, the valve 94 would move to the left thus providing communication between conduits 92 and 96 and between conduits 90 and 98.

Mounted on dump body 30 are a pair of mercury switches 104 and 106. Wire leads 108 and 110 extend from contacts disposed within mercury switch 106 and wire leads 112 and 114 extend from similar contacts disposed within mercury switch 104. When the bottom of dump body 30 is maintained on a substantially level plane as illustrated in FIG. 5 the switch contacts with which wire leads 108, 110, 112 and 114 are associated are submerged in the mercury of these switches. In this manner electrical current may flow between wire leads 108 and 110 and wire leads 112 and 114. Wire leads 108 and 112 are parallel connected through a switch 116 to a suitable DC power source which may be the conventional 6- or 12-volt electrical system of the vehicle for example. Returning now to the hydraulic portion of the control system, the conduit 98 is connected to the outlet of a two-way selector valve 118. Selector valve 118 is utilized to direct the flow of pressurized fluid exiting from a hydraulic pump 120. Hydraulic pump 120 may comprise a part of the vehicle's power steering system and selector valve 118 when in the position illustrated shows the pressurized fluid output of the pump being directed to a conduit 122 which leads to the power steering cylinder 124. The source of hydraulic fluid for pump 120 is a hydraulic reservoir 126 connected to the inlet of the pump.

The control system shown in FIG. 5 is normally in an inactive state when actual dumping operations are not being carried out. In other words, switch 116 which is preferably situated in the cab of the vehicle remains open and selector valve 118 is positioned such that the output of pump 120 is directed to the power steering cylinder 124 through line 122. Just prior to dumping material from dump body 30, however, the vehicle operator closes switch 116 in the cab. Substantially simultaneously with this operation, the driver positions valve 118 so that the output of pump 120 is directed through fluid conduit 98. For the relatively brief period of time during which dumping operations are to be carried out, the driver may steer the vehicle without the aid of the power steering system.

In the event the bottom surface of dump body 30 is in a substantially horizontal position current will flow through both of the mercury switches 104 and 106, thereby energizing both solenoids 100 and 102 which are electrically operatively associated with leads 114 and 110, respectively. Since both solenoids are energized the valve 94 maintains the position illustrated in FIG. 5 and the output of hydraulic fluid from pump 120 will be circulated through fluid conduit 98, the valve 94, fluid conduit 96, reservoir 126 and thence back to the pump 120.

In the event the bottom surface of dump body 30 is inclined downwardly to the left as viewed in FIG. 5, however, the contact of mercury switch 106 with which wire lead 110 is associated will exit from the mercury of the switch in an obvious manner thereby halting current flow through that switch and deenergizing solenoid 102. Solenoid 100 is then free to move valve 94 to the left and pressurized hydraulic fluid will flow from fluid conduit 98, through the valve 94, through fluid conduit 90, and into chamber 72 above piston 74. This will move stop plate 78 down below the bottom of bearing block 56 a distance sufficient to bear against bearing member 80 and raise the dump body bottom upwardly on the left-hand side thereof so that it remains in a substantially level condition. As piston 74 moves downwardly, hydraulic fluid disposed in the lower portion of chamber 72 will exit through fluid conduit 92, flow through the valve 94 and fluid conduit 96 and empty into reservoir 126.

Assuming that the bottom of dump body 30 as shown in FIG. 5 is inclined downwardly and to the right upon energization of the control system, mercury switch 104 will remain open and valve 94 will move to the right under the influence of solenoid 102. Pressurized fluid from pump 120 will then flow through fluid conduit 98, valve 94, fluid conduit 92, and into chamber 72 below piston 74. This will raise contact plate 78 above the level of the bottom of bearing block 56 and permit the bottom of dump body 30 to maintain a substantially level position. As stop plate 78 moves in an upwardly direction hydraulic fluid disposed in chamber 72 above piston 74 will exit through conduit 90, valve 94, conduit 96 and thence into reservoir 126.

It should be noted that the system of FIG. 5 is automatic and continuously operable as long as switch 116 remains closed and the output of pump 120 is received by conduit 98. In other words, as the bottom of dump body 30 attains a generally horizontal condition due to the placement of stop plate 78, both mercury switches 104 and 106 again become closed. Both solenoids are then again actuated and valve 94 is moved to the position illustrated in FIG. 5. In the event the vehicle is being driven across uneven terrain the dump body may tip either to the right or to the left and the system will automatically compensate for this tipping by either raising or lowering stop plate 78. Since stop plate 78 during the dumping operation continuously bears against bearing member 80 on axle 36 this movement of the stop plate will either raise or lower the left side of the dump body as required to make adjustment. The rate of adjustment may be controlled by means of a variable flow control device 130 which is disposed in fluid conduit 98. After the dumping operation has been carried out, the truck operator deenergizes the control system by opening switch 116. In the event a power steering pump has been used to power the hydraulic portion of the system, the output of the pump will be switched through a suitable valving arrangement to the power steering cylinder.

From the foregoing detailed description, it is believed apparent that the present invention enables the attainment of the objects initially set for herein. It should be understood, however, that the invention is not intended to be limited to the specific details of the illustrated embodiments, but rather is defined by the accompanying claims. For example, in the place of the leaf springs 40, rigid walking beams having resilient mountings may be employed. Such leaf springs are well known in the vehicle suspension art.

I claim:

1. In combination, a tractor, a semi end dump trailer body, a support carriage connected to the rear end of the trailer body for pivotal movement, the carriage comprising front and rear resiliently mounted wheel-bearing axles, means interconnecting the tractor and trailer body operable to tip the trailer body upwardly while moving it toward the tractor, pairs of complemental stop members carried by the trailer body and the rear axle of the support carriage operable to cause said body to tip about said rear axle during the latter part of the tipping upwardly of said body, one of said pairs of stop members including means associated therewith for selectively adjusting one of the stop members of said pair toward and away from the other to position said body in a substantially level condition as said body is tipped upwardly.

2. The combination of claim 1, said last-mentioned means including sensing means and means responsive thereto for automatically adjusting said stop members relative to each other in response to a laterally tipped condition of said body during the tipping upwardly of said body.

3. The combination of claim 2, said means responsive thereto comprising a hydraulic circuit containing valve means including a three position valve element adapted to assume a no-flow intermediate position and positive flow extreme positions, and valve element positioning means comprising a pair of solenoids adapted to exert oppositely directed forces on said valve element when both of said solenoids are energized to maintain said valve element in the no-flow intermediate position.

4. The combination of claim 3, said means responsive thereto further comprising a pair of mercury switches fixedly positioned with respect to said body so that said switches are closed only when said body is substantially level, each of said switches being disposed between an electrical power source and one of said solenoids whereby when said body is substantially level both solenoids are energized and exert opposite forces on said three position valve element to maintain said valve element in said intermediate position and whereby when said body is not substantially level only one of said solenoids remains energized and said valve element is pulled to one of said extreme positions to thereby selectively move one of said pair of stop members relative to the other.

* * * * *